United States Patent
Kobayashi et al.

(10) Patent No.: US 11,738,860 B2
(45) Date of Patent: Aug. 29, 2023

(54) COMPOUND HELICOPTER

(71) Applicant: SUBARU CORPORATION, Tokyo (JP)

(72) Inventors: Wataru Kobayashi, Tokyo (JP); Hirotaka Hayashi, Tokyo (JP); Mizuki Nakamura, Tokyo (JP); Masafumi Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/307,409

(22) Filed: May 4, 2021

(65) Prior Publication Data

US 2021/0371090 A1    Dec. 2, 2021

(30) Foreign Application Priority Data

Jun. 1, 2020   (JP) ................................ 2020-095178

(51) Int. Cl.
*B64C 27/26* (2006.01)

(52) U.S. Cl.
CPC .................... *B64C 27/26* (2013.01)

(58) Field of Classification Search
CPC .. B64C 27/22; B64C 5/16; B64C 5/10; B64C 5/08; B64D 27/26
See application file for complete search history.

(56) References Cited

U.S. PATENT DOCUMENTS

| | | | | |
|---|---|---|---|---|
| 2,517,509 | A * | 8/1950 | Sikorsky | B64C 1/00 123/41.11 |
| 3,718,294 | A * | 2/1973 | Krenz | B64C 29/0058 244/12.3 |
| 3,834,654 | A * | 9/1974 | Miranda | B64C 39/068 244/45 R |
| 4,238,094 | A | 12/1980 | McGann | |
| 6,138,954 | A * | 10/2000 | Gaunt | B64C 9/22 244/214 |
| 6,766,980 | B1 | 7/2004 | Greenston | |
| 9,120,564 | B1 * | 9/2015 | White | B64C 11/24 |
| 2009/0236467 | A1 | 9/2009 | Heminway | |

FOREIGN PATENT DOCUMENTS

JP    H03-121996 A    5/1991

OTHER PUBLICATIONS

Extended European Search Report dated Oct. 15, 2021 for European Patent Application No. 21173866.1-1010.

* cited by examiner

*Primary Examiner* — Philip J Bonzell
*Assistant Examiner* — Ashesh Dangol
(74) *Attorney, Agent, or Firm* — McGinn I.P. Law Group, PLLC.

(57) ABSTRACT

A compound helicopter includes a fuselage, a fixed wing, a rotary wing, and a barrier member. The fixed wing is fixed to the fuselage. The rotary wing is rotatably coupled to the fuselage. The barrier member is attached to a part, of the fuselage, that is above the fixed wing and is between the rotary wing and the fixed wing. The barrier member is configured to generate no lift upon forward flight.

19 Claims, 4 Drawing Sheets

COMPOUND HELICOPTER

CROSS-REFERENCE TO RELATED APPLICATIONS

The present application claims priority from Japanese Patent Application No. 2020-095178 filed on Jun. 1, 2020, the entire contents of which are hereby incorporated by reference.

BACKGROUND

The technology relates to a compound helicopter including a rotary wing and a fixed wing.

For example, a compound helicopter 100 including a rotary wing 101 and a fixed wing 102 as illustrated in FIG. 8 has been studied, for example, as disclosed in Japanese Unexamined Patent Application Publication No. H3-121996, etc.

Such a compound helicopter 100 is configured to support its own weight by means of lift resulting from rotation of the rotary wing 101 upon hovering, and to support its own weight by means of both lift deriving from the rotary wing 101 and lift deriving from the fixed wing 102 upon forward flight.

Various types of compound helicopters have been proposed. Examples of known types of compound helicopters may include: a compound helicopter of a type that tilts an airframe to use part of lift derived from a rotary wing as thrust to fly forward like a helicopter; and a compound helicopter of a type that obtains thrust by means of a component, such as a propeller or a jet engine, attached to a part such as a fuselage or a fixed wing and thereby flies forward.

SUMMARY

An aspect of the technology provides a compound helicopter that includes a fuselage, a fixed wing, a rotary wing, and a barrier member. The fixed wing is fixed to the fuselage. The rotary wing is rotatably coupled to the fuselage. The barrier member is attached to a part, of the fuselage, that is above the fixed wing and is between the rotary wing and the fixed wing. The barrier member is configured to generate no lift upon forward flight.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
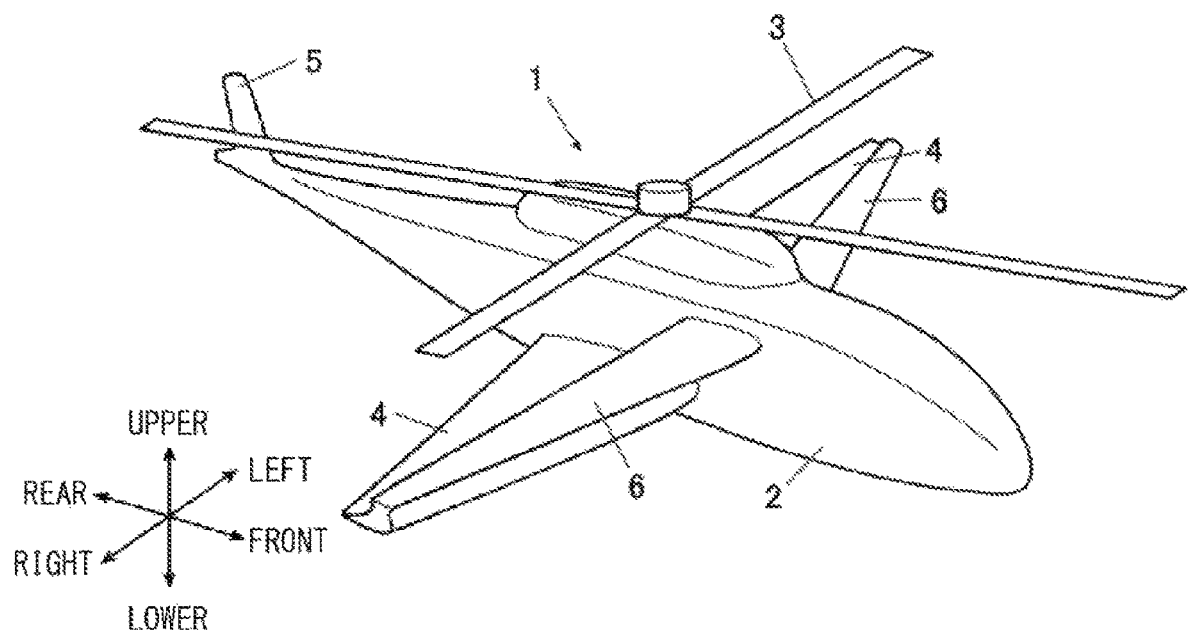
FIG. 1 is a perspective view of an example of a configuration of a compound helicopter according to an example embodiment of the technology.

Regarding the compound helicopter 100, lift is generated at both the rotary wing 101 and the fixed wing 102 upon forward flight. The fixed wing 102 may be influenced by aerodynamic interference (downwash) from the rotary wing 101, and the rotary wing 101 may be influenced by aerodynamic interference (upwash) from the fixed wing 102. This may lower aerodynamic performance compared with the original performance. That is, this may reduce the lift and increase the drag.

Accordingly, in order to compensate for the lowered aerodynamic performance, additional power may be required. For example, the thrust of the rotary wing 101 may be increased. However, this may lead to an issue that flight efficiency of the airframe as a whole is lowered.

It is desirable to provide a compound helicopter that is able to reduce aerodynamic interference between a rotary wing and a fixed wing upon forward flight to thereby allow each of the rotary wing and the fixed wing to serve with the original aerodynamic performance or aerodynamic performance close thereto. As used herein, the term "original aerodynamic performance" refers to the aerodynamic performance to be exerted in a situation with no aerodynamic interference.

In the following, some example embodiments of the technology related to a compound helicopter are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. In the following, each of an upper-lower direction, a front-rear direction, and a left-right direction is a direction set using a compound helicopter as a reference.

FIG. 1 illustrates an example of a configuration of a compound helicopter according to an example embodiment. According to the example embodiment, a compound helicopter 1 may include a fuselage 2, a rotary wing 3, a fixed wing 4, and a vertical stabilizer 5. The compound helicopter 1 may further include any other member.

Note that the number of the blades of the rotary wing 3 of the compound helicopter 1 is not limited to four as illustrated in FIG. 1. Although not illustrated, the fixed wing 4 may be provided with members including, without limitation, a flap and an aileron. Although not illustrated, the vertical stabilizer 5 may be provided with a member such as a rudder, and may also be provided with a member such as a tail rotor as appropriate.

Although not illustrated, the following description is given under the assumption that propulsion devices including, without limitation, a propeller and a jet engine are provided on parts including, without limitation, the fuselage 2 (a front part, a rear part, a side surface, or the like thereof) and the fixed wing 4. This is similarly applicable to a compound helicopter of a type that tilts its airframe forward upon forward flight.

The compound helicopter 1 further includes a barrier member 6. The barrier member 6 is attached to a part, of the fuselage 2, that is above the fixed wing 4 and is between the rotary wing 3 and the fixed wing 4.

The barrier member 6 is not a wing and is configured to generate no lift upon forward flight of the compound helicopter 1. Therefore, the barrier member 6 may be different from a wing such as a fixed wing of a biplane or a box wing.

Note that, as used herein, the wording "generate no lift" not only refers to a case where lift is not generated at all but also encompasses a case where substantially no lift is generated and a case where a small amount of lift is generated.

Figure 2A:
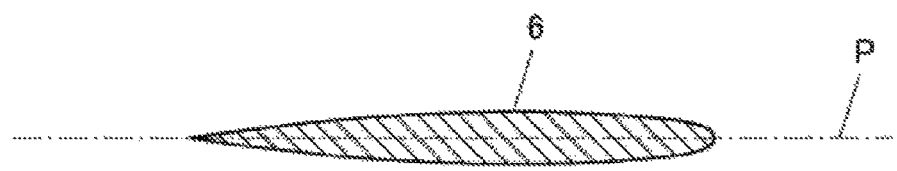
FIG. 2A is a cross-sectional view of an example of a barrier member having a cross-sectional shape that is symmetrical in an upper-lower direction.
Figure 2B:
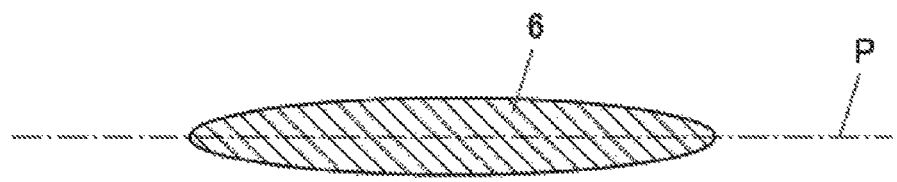
FIG. 2B is a cross-sectional view of an example of the barrier member having a cross-sectional shape close to an ellipse.
Figure 3:
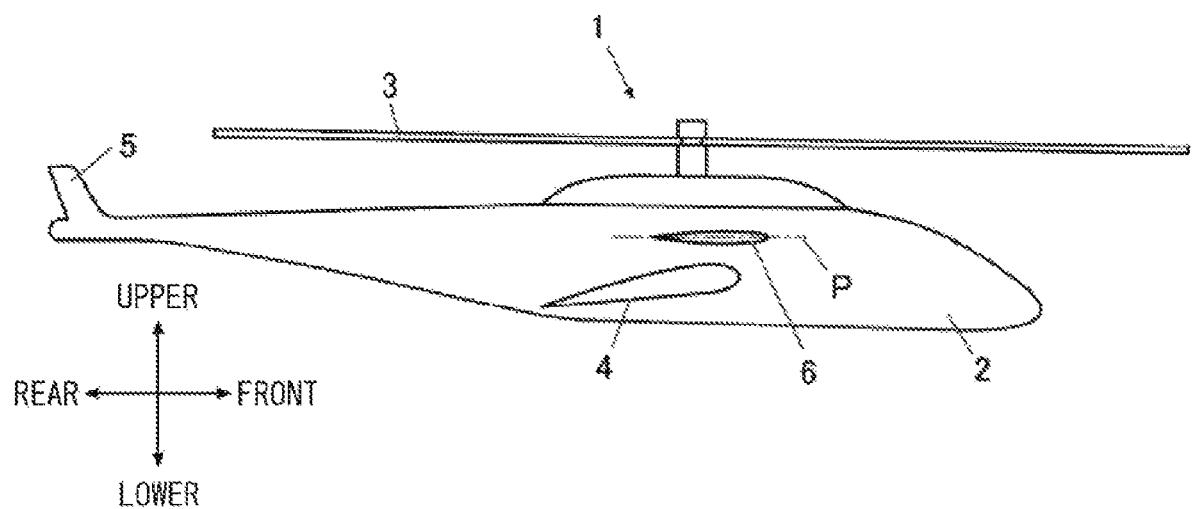
FIG. 3 is a side view of an example of the barrier member that is so attached as to be oriented horizontally upon forward flight.

For example, the barrier member 6 may have a cross-section that is symmetrical about a plane P coupling a front end and a rear end of the barrier member 6 to each other. In one example, the barrier member 6 may have a cross-sectional shape that is symmetrical in an upper-lower direction, as illustrated in FIG. 2A. In another example, the barrier member 6 may have a cross-sectional shape that is close to an ellipse, as illustrated in FIG. 2B. Further, as illustrated in FIG. 3, the barrier member 6 may be attached to the fuselage 2 in such a manner that the plane P coupling the front end and the rear end of the barrier member 6 to each other is oriented horizontally upon forward flight.

According to the example embodiment, the barrier member 6 may be symmetrical about the plane P coupling the front end and the rear end of the barrier member 6 to each other as described above, thereby preventing the barrier member 6 itself from generating lift upon forward flight. In addition, the barrier member 6 may be so attached to the fuselage 2 in such a manner that the barrier member 6 is oriented horizontally upon forward flight to cause an angle of attack of the barrier member 6 to be 0 (zero) degrees or substantially 0 (zero) degrees. This configuration allows the barrier member 6 to generate no lift due to forward flight of the compound helicopter 1 upon the forward flight of the compound helicopter 1.

Note that, as used herein, the wording "oriented horizontally" not only refers to a case where it is exactly oriented horizontally but also encompasses a case where it is oriented substantially horizontally.

In a case where the compound helicopter 1 is a type that tilts its airframe forward to fly forward and where the barrier member 6 is attached to the fuselage 2 in such a manner that the barrier member 6 is oriented horizontally with respect to the fuselage 2 in a landed state, the forward tilt of the airframe at the time of forward flight causes the barrier member 6 to be also tilted forward.

Figure 4:
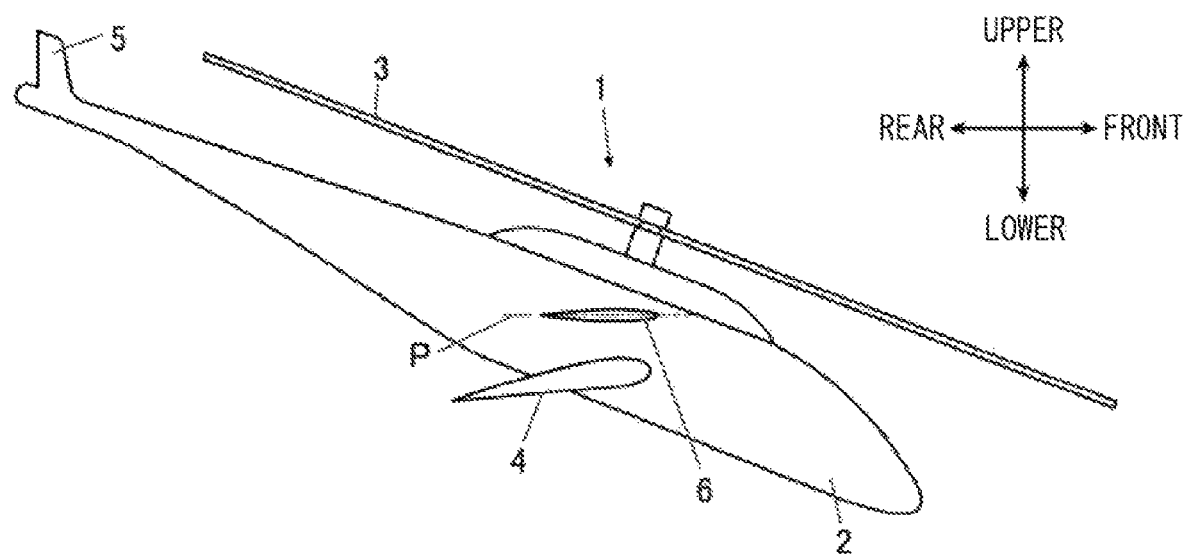
FIG. 4 is a side view of an example of the barrier member that is so attached as to be oriented horizontally upon forward flight in a compound helicopter of a type that tilts its airframe to fly forward.

To address this in such a case, as illustrated in FIG. 4, the barrier member 6 may be attached to the fuselage 2 in such a manner that the barrier member 6 is oriented horizontally when the airframe is tilted forward upon a predetermined kind of forward flight such as a high-speed flight.

Figure 5:
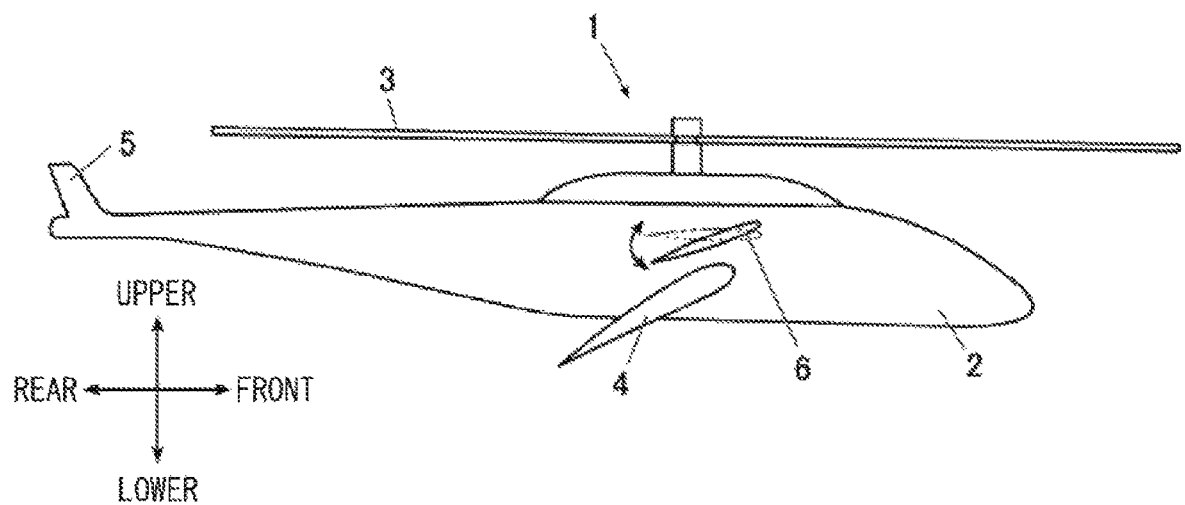
FIG. 5 is a side view of an example of a configuration in which the barrier member is swingably attached to a fuselage.

In another example, as illustrated in FIG. 5, the barrier member 6 may be swingably attached to the fuselage 2, thereby allowing the barrier member 6 to be oriented horizontally.

With this configuration, the barrier member 6 may swing appropriately when the airframe is tilted forward upon forward flight. Thus, the compound helicopter of a type that tilts its airframe forward upon forward flight may also be able to cause the angle of attack of the barrier member 6 to be 0 (zero) degrees or substantially 0 (zero) degrees when the airframe is tilted forward upon the forward flight. This makes it possible to generate no lift at the barrier member 6 upon forward flight of the compound helicopter 1.

Next, the workings of the compound helicopter 1 according to the example embodiment, in particular, the workings of the barrier member 6 are described below.

Figure 6:
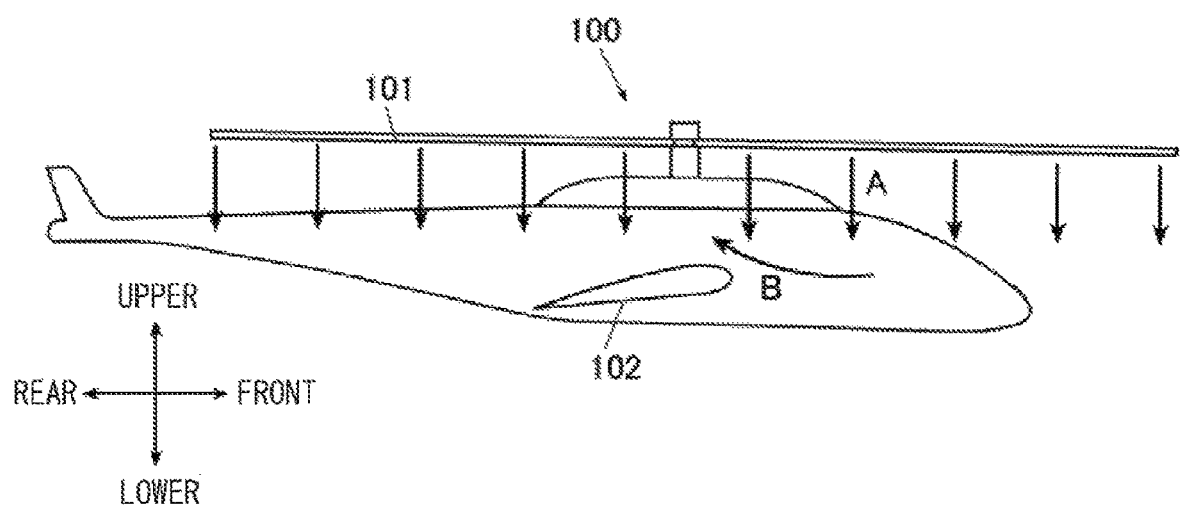
FIG. 6 is a diagram for describing that an existing compound helicopter involves occurrence of aerodynamic interference between a rotary wing and a fixed wing.
Figure 8:
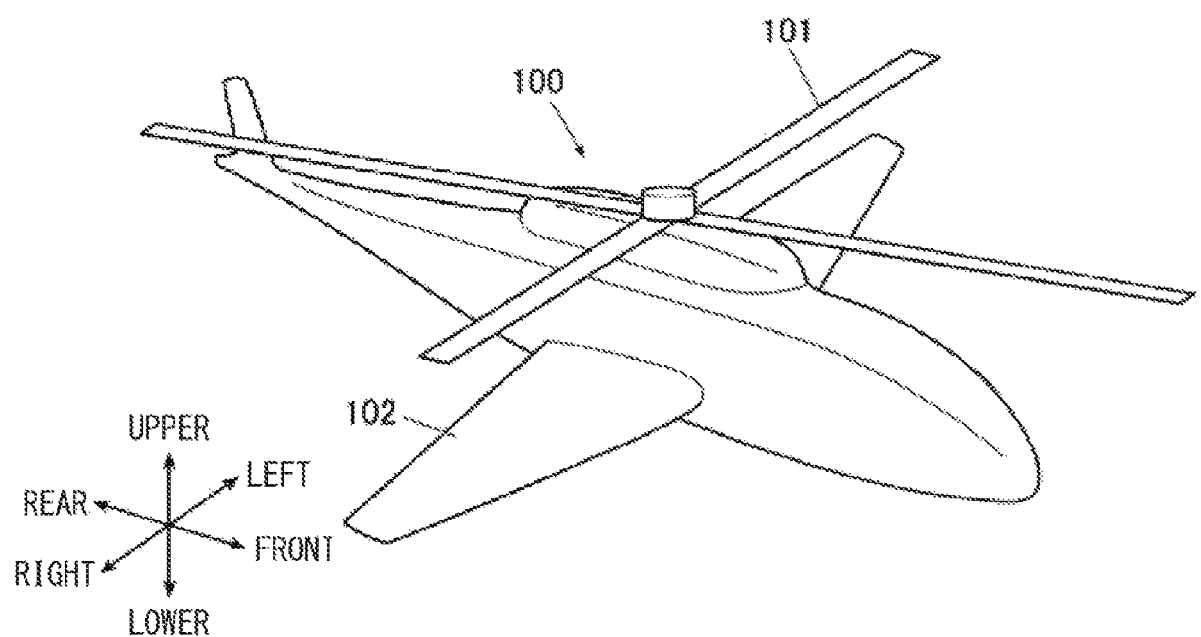
FIG. 8 is a perspective view of an example of a configuration of the existing compound helicopter.

As illustrated in FIG. 6, in a case of the existing compound helicopter 100, such as that illustrated in FIG. 8, that includes no barrier member 6 of the example embodiment, the fixed wing 102 may be influenced by downwash A (aerodynamic interference) from the rotary wing 101. This may degrade the lift-to-drag ratio. That is, the lift may decrease, and the drag may increase. As a result, the aerodynamic performance may be lowered compared with the original aerodynamic performance. In addition, the rotary wing 101 may be influenced by upwash B (aerodynamic interference) from the fixed wing 102. This may also degrade the lift-to-drag ratio, lowering the aerodynamic performance compared with the original aerodynamic performance.

To compensate for thus-lowered aerodynamic performance of the fixed wing 102 and the rotary wing 101, additional power may have to be provided, for example, by increasing the thrust of the rotary wing 101. This may lead to lowered flight efficiency of the airframe as a whole.

Figure 7:
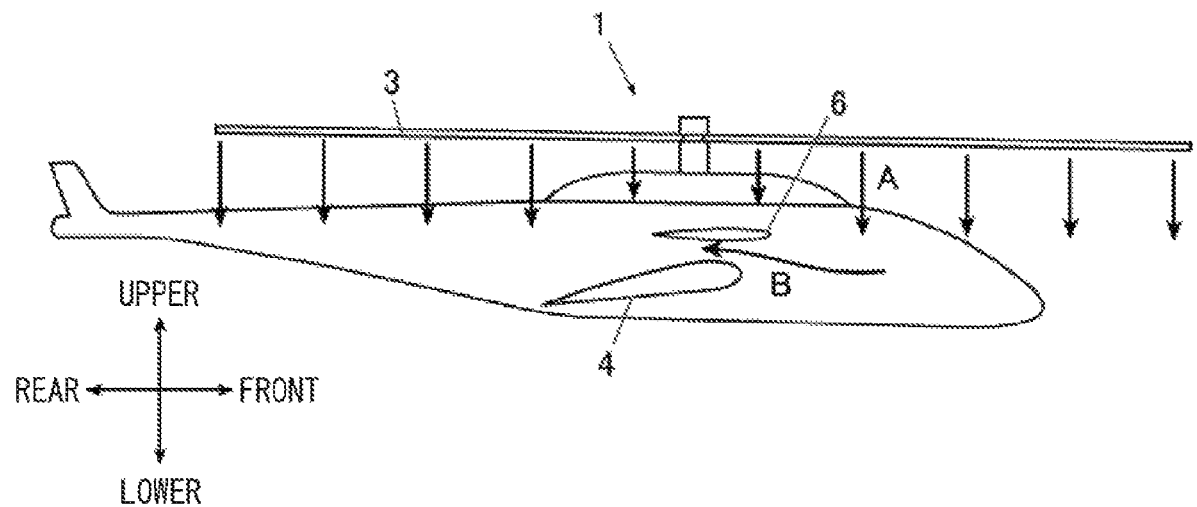
FIG. 7 is a diagram for describing that the compound helicopter according to the example embodiment eliminates or reduces aerodynamic interference between a rotary wing and a fixed wing by means of the barrier member.

In contrast, as illustrated in FIG. 7, the compound helicopter 1 according to the example embodiment includes the barrier member 6 provided at a part that is above the fixed wing 4 and is between the rotary wing 3 and the fixed wing 4. Accordingly, at the part with the barrier member 6, the downwash A from the rotary wing 3 may be blocked by the barrier member 6. This prevents such downwash A from reaching the fixed wing 4, or reducing the downwash A reaching the fixed wing 4 to a small amount. This eliminates the aerodynamic interference from the downwash A from the rotary wing 3 on the fixed wing 4 or reduces such aerodynamic interference to a very small amount.

According to the example embodiment, it is thereby possible to suppress degradation of performance of the fixed wing 4 due to the downwash A from the rotary wing 3, allowing the fixed wing 4 to serve with the original aerodynamic performance or aerodynamic performance close thereto.

Further, because the compound helicopter 1 according to the example embodiment is provided with the barrier member 6 as described above, the upwash B from the fixed wing 4 may be blocked by the barrier member 6, as illustrated in FIG. 7. This prevents such upwash B from reaching the rotary wing 3, or reducing the upwash B reaching the rotary wing 3 to a small amount. This eliminates the aerodynamic interference derived from the upwash B from the fixed wing 4 on the rotary wing 3 or reduces such aerodynamic interference to a very small amount.

According to the example embodiment, it is thereby possible to suppress degradation of performance of the rotary wing 3 due to the upwash B from the fixed wing 4, allowing the rotary wing 3 to serve with the original aerodynamic performance or aerodynamic performance close thereto.

With a configuration in which the barrier member 6 itself generates lift, the rotary wing 3 may be influenced by upwash from the barrier member 6, and the fixed wing 4 may be influenced by downwash from the barrier member 6. This may lead to a new aerodynamic interference issue similar to that in the case of the existing compound helicopter 100 illustrated in FIG. 6.

However, the example embodiment has a configuration that generates no lift at the barrier member 6 upon forward flight of the compound helicopter 1, as described above. Therefore, the example embodiment does not involve the above-described new aerodynamic interference issue even with the barrier member 6. In addition, the provision of the barrier member 6 allows each of the rotary wing 3 and the fixed wing 4 to serve with its original aerodynamic performance or aerodynamic performance close thereto.

As described above, according to the compound helicopter 1 of the example embodiment, the barrier member 6 is provided at a part that is above the fixed wing 4 and is between the rotary wing 3 and the fixed wing 4. In addition, the barrier member 6 generates no lift even upon forward flight of the compound helicopter 1. This suppresses aerodynamic interference between the rotary wing 3 and the fixed wing 4 upon the forward flight of the compound helicopter 1, allowing each of the rotary wing 3 and the fixed wing 4 to serve with the original aerodynamic performance or aerodynamic performance close thereto.

Accordingly, the compound helicopter 1 according to the example embodiment requires no or a very small amount of additional power for compensating the lowered aerodynamic performance of the rotary wing 3 or the fixed wing 4. It is therefore possible to improve flight efficiency of the airframe as a whole.

Note that the barrier member 6 with a large size may lead to an adverse influence such as increase in drag on the airframe. For such a reason, the barrier member 6 may be provided with a size of a bare minimum at a location that allows for effective achievement of the workings and effects described above, thereby suppressing the increase in drag, etc., in one example.

Further, in order to avoid or reduce the influence of a wing-tip vortex generated at the fixed wing 4 or a vortex of airflows that may be generated at a tip (an end in the left-right direction) of the barrier member 6, the tip of the barrier member 6 may be bent downward to be coupled to the wing tip of the fixed wing 4, as illustrated in FIG. 1.

Some example embodiments of the technology have been described above; however, it is needless to say that the embodiment of the technology is not limited to the example embodiments described above and is appropriately modifiable without departing from the gist of the technology.

The invention claimed is:

1. A compound helicopter comprising:
a fuselage;
a fixed wing fixed to the fuselage;
a rotary wing rotatably coupled to the fuselage; and
a barrier member attached to a part, of the fuselage, that is above the fixed wing and is between the rotary wing and the fixed wing,
wherein at least a part of a lower surface of the barrier member is facing an upper surface of the fixed wing and is exposed to an upwash from the fixed wing during forward flight of the compound helicopter,
wherein at least a part of an upper surface of the barrier member is exposed to a downwash from the rotary wing during the forward flight of the compound helicopter,
wherein the barrier member includes a front end, a rear end, and a cross-section that is symmetrical about a plane coupling the front end and the rear end to each other, and
wherein, upon a forward flight at a predetermined speed, an angle of attack of the barrier member is zero degrees.

2. The compound helicopter according to claim 1, wherein the barrier member is swingably attached to the fuselage to allow the plane to be oriented horizontally upon the forward flight at the predetermined speed.

3. The compound helicopter according to claim 1, wherein the barrier member includes a tip that is coupled to a wing tip of the fixed wing.

4. The compound helicopter according to claim 1, wherein the barrier member blocks at least a part of the downwash from the rotary wing to reach the upper surface of the fixed wing during the forward flight of the compound helicopter.

5. The compound helicopter according to claim 1, wherein the barrier member is disposed in a downwash of the rotary wing and an upwash from the fixed wing.

6. The compound helicopter according to claim 1, wherein the barrier member is rotated based on a flight condition such that the barrier member is oriented horizontally during flight.

7. The compound helicopter according to claim 1, wherein the barrier member is swingably attached to the fuselage to maintain the angle of attack of zero degrees of the barrier member during flight of the compound helicopter.

8. The compound helicopter according to claim 1, wherein upon the forward flight at the predetermined speed, the fuselage is tilted forward.

9. The compound helicopter according to claim 8, wherein the barrier member is swingably attached to the fuselage to maintain the angle of attack of zero degrees of the barrier member during flight of the compound helicopter.

10. The compound helicopter according to claim 1, wherein, upon a forward flight at a predetermined speed, an angle of attack of the barrier member is substantially zero degrees.

11. A compound helicopter comprising:
a fuselage;
a fixed wing fixed to the fuselage;
a rotary wing rotatably coupled to the fuselage; and
a barrier member attached to a part, of the fuselage, that is above the fixed wing and is between the rotary wing and the fixed wing,
wherein the barrier member includes a front end, a rear end, and a cross-section that is symmetrical about a plane coupling the front end and the rear end to each other, and
wherein, upon a forward flight at a predetermined speed, an angle of attack of the barrier member is zero degrees.

12. The compound helicopter according to claim 11, wherein the barrier member blocks at least a part of a downwash from the rotary wing to reach an upper surface of the fixed wing during forward flight of the compound helicopter.

13. The compound helicopter according to claim 11, wherein upon the forward flight at the predetermined speed, the fuselage is tilted forward.

14. The compound helicopter according to claim 13, wherein the barrier member is swingably attached to the fuselage to maintain the angle of attack of zero degrees of the barrier member during flight of the compound helicopter.

15. The compound helicopter according to claim 11, wherein, upon a forward flight at a predetermined speed, an angle of attack of the barrier member is substantially zero degrees.

16. A compound helicopter comprising:
a fuselage;
a fixed wing fixed to the fuselage;
a rotary wing rotatably coupled to the fuselage; and
a barrier member attached to a part, of the fuselage,
wherein the barrier member is disposed in a downwash of the rotary wing and an upwash from the fixed wing,
wherein the barrier member includes a front end, a rear end, and a cross-section that is symmetrical about a plane coupling the front end and the rear end to each other,
wherein upon a forward flight at a predetermined speed, the fuselage is tilted forward, and
wherein upon the forward flight at the predetermined speed, an angle of attack of the barrier member is zero degrees.

17. The compound helicopter according to claim 16, wherein the barrier member blocks at least a part of the downwash from the rotary wing to reach an upper surface of the fixed wing during forward flight of the compound helicopter.

18. The compound helicopter according to claim 16, wherein the barrier member is swingably attached to the fuselage to maintain the angle of attack of zero degrees of the barrier member during flight of the compound helicopter.

19. The compound helicopter according to claim 16, wherein, upon a forward flight at a predetermined speed, an angle of attack of the barrier member is substantially zero degrees.

* * * * *